(12) United States Patent
Nakasuga et al.

(10) Patent No.: US 9,221,931 B2
(45) Date of Patent: Dec. 29, 2015

(54) METHOD FOR PRODUCING POLYPROPYLENE MATERIAL, AND POLYPROPYLENE MATERIAL

(71) Applicant: SEKISUI CHEMICAL CO., LTD., Osaka, Osaka (JP)

(72) Inventors: Akira Nakasuga, Osaka (JP); Hironori Tabata, Hirakata (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/343,127

(22) PCT Filed: Mar. 8, 2013

(86) PCT No.: PCT/JP2013/056402
§ 371 (c)(1),
(2) Date: Mar. 6, 2014

(87) PCT Pub. No.: WO2013/172076
PCT Pub. Date: Nov. 21, 2013

(65) Prior Publication Data
US 2014/0228534 A1    Aug. 14, 2014

(30) Foreign Application Priority Data
May 15, 2012  (JP) .................................. 2012-111744

(51) Int. Cl.
*C08F 110/06* (2006.01)
*B29C 71/02* (2006.01)
(Continued)

(52) U.S. Cl.
CPC ........... *C08F 110/06* (2013.01); *B29C 71/0063* (2013.01); *B29C 71/0072* (2013.01);
(Continued)

(58) Field of Classification Search
CPC .............. B29C 71/02; B29C 2071/022; B29C 2071/027; C08F 10/06; C08F 110/06; C08F 210/06
USPC .................... 264/346, 901; 528/503; 526/351
See application file for complete search history.

(56) References Cited

U.S. PATENT DOCUMENTS 2,914,515 A * 11/1959 Stuart ........................... 526/159
3,394,045 A *  7/1968 Gould ........................... 428/337
(Continued)

FOREIGN PATENT DOCUMENTS

CN         101432642 A    5/2009
JP           2-52722 A    2/1990
(Continued)

OTHER PUBLICATIONS

Ito et al. (JP 05-104622 A) Apr. 27, 1993, abstract and translation in English.*
(Continued)

*Primary Examiner* — Rip A Lee
(74) *Attorney, Agent, or Firm* — Cheng Law Group, PLLC

(57) ABSTRACT

Provided is a method for producing a polypropylene material, which can improve the heat resistance of the polypropylene material. The method for producing a polypropylene material comprises: a melting step of melting a polypropylene material rolled in at least one direction, at a temperature that is higher than Tm+5° C. where Tm is a melting peak temperature of the polypropylene material not rolled yet as measured by differential scanning calorimetry, and is equal to or lower than Tm+60° C.; and a heat treatment step of heat-treating the polypropylene material melted in the melting step, at a temperature that is equal to or higher than Tm−20° C., and is lower than Tm−10° C.

7 Claims, 1 Drawing Sheet

(51) Int. Cl.
*B29C 71/00* (2006.01)
*C08F 10/06* (2006.01)
*C08L 23/16* (2006.01)
*B29K 23/00* (2006.01)

(52) U.S. Cl.
CPC .......... *B29C71/02* (2013.01); *B29C 2071/022* (2013.01); *B29K 2023/12* (2013.01); *C08F 10/06* (2013.01); *C08L 23/16* (2013.01)

(56) References Cited

U.S. PATENT DOCUMENTS

| | | | |
|---|---|---|---|
| 3,801,404 A | | 4/1974 | Druin et al. |
| 4,234,530 A | * | 11/1980 | Thiel et al. .................... 264/151 |
| 4,803,027 A | * | 2/1989 | Peiffer et al. .............. 264/210.5 |
| 5,069,855 A | * | 12/1991 | Takasu et al. .................. 264/235 |
| 5,458,845 A | * | 10/1995 | Ishii et al. ..................... 264/515 |
| 6,017,480 A | | 1/2000 | Yoshida et al. |
| 8,796,413 B2 | * | 8/2014 | Tabata et al. .................. 528/480 |
| 8,846,795 B2 | * | 9/2014 | Tabata et al. .................. 524/424 |
| 2009/0227756 A1 | * | 9/2009 | Hino et al. .................... 526/351 |
| 2013/0041124 A1 | * | 2/2013 | Tabata et al. .................. 526/351 |

FOREIGN PATENT DOCUMENTS

| | | | | |
|---|---|---|---|---|
| JP | 2-214645 A | | 8/1990 | |
| JP | 05-104622 A | * | 4/1993 | .............. B29C 55/06 |
| JP | 9-254252 A | | 9/1997 | |
| JP | 10-58532 A | | 3/1998 | |
| JP | 10-296849 A | | 11/1998 | |
| JP | 10-298305 A | | 11/1998 | |
| JP | 2003-292649 A | * | 10/2003 | ................. C08J 7/00 |
| JP | 2011-19583 A | * | 10/2011 | ................. C08J 7/00 |
| JP | 2011-195830 A | | 10/2011 | |
| WO | WO-2012/008223 A1 | | 1/2012 | |
| WO | WO 2012/043060 A1 | * | 4/2012 | .............. B29C 43/10 |

OTHER PUBLICATIONS

JP 2011-195830 (Oct. 6, 2011); machine translation.*
JP 2003-292649 (Oct. 15, 2003); machine translation.*
International Search Report for the Application No. PCT/JP2013/056402 mailed May 14, 2013.
Written Opinion of the International Searching Authority (PCT/ISA/237) for Application No. PCT/JP2013/056402 mailed May 14, 2013.
Written Opinion of the International Searching Authority (PCT/ISA/237) for Application No. PCT/JP2013/056402 mailed May 14, 2013 (English Translation mailed Nov. 27, 2014).
Supplementary European Search Report for the Application No. EP 13 79 0047 dated Apr. 9, 2015.
The First Office Action for the Application No. 201380004313.8 from The State Intellectual Property Office of the People's Republic of China dated Aug. 27, 2015.

* cited by examiner

METHOD FOR PRODUCING POLYPROPYLENE MATERIAL, AND POLYPROPYLENE MATERIAL

TECHNICAL FIELD

The present invention relates to a method for producing a polypropylene material and a polypropylene material.

BACKGROUND ART

A polypropylene material has a high mechanical strength and an excellent heat resistance, and therefore is used in a variety of fields. As a method for further improving the mechanical strength of a polypropylene material, a method for enhancing the crystallinity of a polypropylene material is known for example. In addition, as a method for further improving the heat resistance of a polypropylene material, a method for raising the melting peak temperature of a polypropylene material by making the molecular chains in a polypropylene material oriented by means of stretching the polypropylene material or the like is known for example.

For example, Patent Literature 1 proposes that a polypropylene preform having a melting peak temperature Tm (° C.) as determined by differential thermal analysis at a temperature rise rate of 20° C./min is heated to a temperature in the range from Tm−15 (° C.) to Tm (° C.) for heat treatment, thereby improving the stiffness and heat resistance of the polypropylene molded body.

CITATION LIST

Patent Literature

Patent Literature 1: Japanese Patent Laid-Open No. 2011-195830

SUMMARY OF INVENTION

Technical Problem

It is believed that, when heating a polypropylene material which has been subjected to an orientation treatment to a temperature equal to or higher than the melting peak temperature, the orientation of the molecular chains, which has been enhanced by the orientation treatment, is lowered, and therefore it is difficult to raise the melting peak temperature of a polypropylene material. In addition, Patent Literature 1 discloses that it is desirable that the orientation of a polypropylene preform to be subjected to a heat treatment is as low as possible.

In such a circumstance, a method for producing a polypropylene material which can raise the melting peak temperature of the polypropylene material and thereby improve the heat resistance thereof is demanded.

The major object of the present invention is to provide a method for producing a polypropylene material which can improve the heat resistance of a polypropylene material.

Solution to Problem

A method for producing a polypropylene material according to the present invention includes a melting step of melting a polypropylene material rolled in at least one direction, at a temperature that is higher than Tm+5° C. and is equal to or lower than Tm+60° C., where Tm is a melting peak temperature of the polypropylene material not rolled yet as measured by differential scanning calorimetry; and a heat treatment step of heat-treating the polypropylene material melted in the melting step, at a temperature that is equal to or higher than Tm−20° C. and lower than Tm−10° C.

Here, a melting peak temperature in the present invention means an endothermic peak on a differential scanning calorimetry (DSC) curve obtained by DSC.

In a specific aspect of the method for producing a polypropylene material according to the present invention, in the melting step, the polypropylene material rolled in at least one direction is melted at a temperature that is equal to or higher than Tm+10° C., and is equal to or lower than Tm+60° C.

In another specific aspect of the method for producing a polypropylene material, a crystallinity A of the polypropylene material before the melting step is 40% or more.

Here, the crystallinity of a polypropylene material in the present invention is a value calculated by dividing the peak area of a DSC curve by 209 mJ/mg and multiplying by 100.

In other aspects of the method for producing a polypropylene material according to the present invention, the melting peak temperature Tm of the polypropylene material not rolled yet before the melting step is 165° C. or higher.

In still another specific aspect of the method for producing a polypropylene material according to the present invention, the heat treatment step is performed for 5 min to 180 min.

A polypropylene material according to the present invention is a polypropylene material obtained by the above method for producing a polypropylene material. A crystallinity A of the polypropylene material before the melting step and a crystallinity B of the polypropylene material after the heat treatment step satisfy a relationship of ((B−A)/A)×100=10% or more. The crystallinity B is 55% or more. The melting peak temperature of the polypropylene material after the heat treatment step as measured by differential scanning calorimetry is equal to or higher than Tm+5° C. where Tm is the melting peak temperature of the polypropylene material not rolled yet.

In a specific aspect of the polypropylene material according to the present invention, a half-height width from the melting peak temperature of the polypropylene material after the heat treatment step as measured by differential scanning calorimetry is 13° C. or more.

Advantageous Effects of Invention

According to the present invention, a method for producing a polypropylene material which can improve the heat resistance of the polypropylene material, and a polypropylene material with an improved heat resistance can be provided.

DESCRIPTION OF EMBODIMENTS

Figure 1:
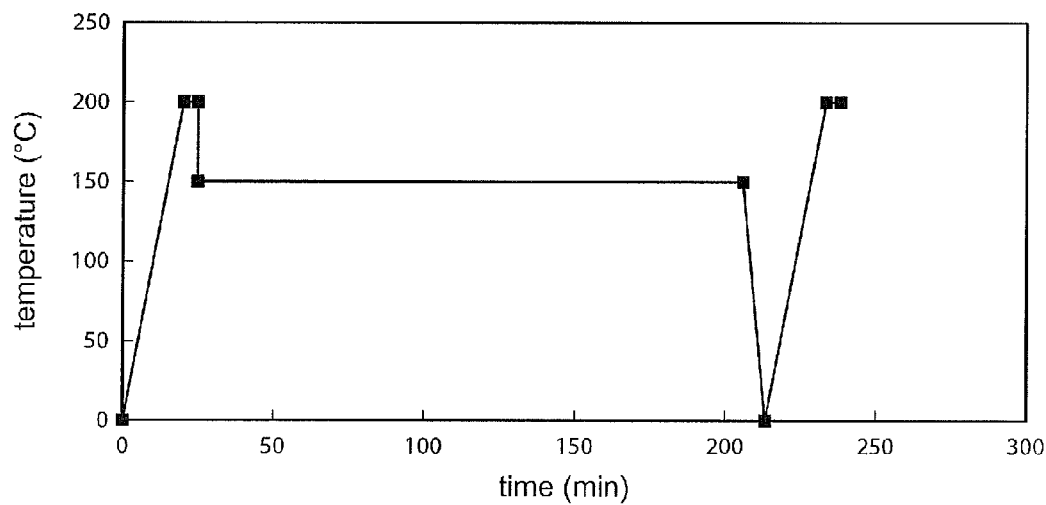
FIG. 1 is a graph showing a temperature profile in Example 1.

Hereinafter, one example of preferable embodiments of the present invention will be described. However, the following embodiment is merely an example. The present invention is not limited to the following embodiment at all.

(Melting Step)

The method for producing a polypropylene material according to the present embodiment includes a melting step of melting a polypropylene material rolled in at least one direction, at a temperature that is higher than Tm+5° C. and is equal to or lower than Tm+60° C., where Tm is a melting peak temperature of the polypropylene material not rolled yet as measured by differential scanning calorimetry.

Examples of the polypropylene material rolled in at least one direction (hereinafter, referred to as "rolled polypropylene material") which is subjected to the melting step include a homopolymer of propylene, a block copolymer of propylene and other α-olefin, and a random copolymer of propylene and another α-olefin. Examples of α-olefin include ethylene, 1-butene, 1-hexene and 1-octene.

The molecular weight distribution (weight-average molecular weight (Mw)/number-average molecular weight (Mn)) of the rolled polypropylene material is preferably 1 to 20.

The melt flow rate (MFR) of the rolled polypropylene material is preferably 0.5 g/10 min to 50 g/10 min. Here, MFR is a value measured by the method defined in JIS K 7210.

In the rolled polypropylene material, the polypropylene material is rolled in at least one direction. The rolled polypropylene material may be rolled in one direction or in two directions, for example. In order to further improve the heat resistance of a polypropylene material, the rolling ratio is preferably about 1.3 times to about 10 times, and more preferably about 1.5 times to about 6 times.

The crystallinity A of the rolled polypropylene material is preferably 40% or more, and more preferably 45% or more. The crystallinity A is usually about 50% or less.

The melting peak temperature Tm of the polypropylene material not rolled yet as measured by differential scanning calorimetry (DSC) is usually 165° C. or higher. The melting peak temperature Tm is usually lower than 170° C.

The rolled polypropylene material may contain an additive. Examples of the additive include a weathering stabilizer such as an antioxidant, an ultraviolet absorber and a radical scavenger, and a crystal nucleating agent.

In the melting step, the rolled polypropylene material is melted at a temperature that is higher than Tm+5° C. and is equal to or lower than Tm+60° C., where Tm is a melting peak temperature as measured by DSC. It is preferable that, in the melting step, the rolled polypropylene material be melted at a temperature that is equal to or higher than Tm+10° C. and is equal to or lower than Tm+60° C., where Tm is a melting peak temperature as measured by DSC. It is more preferable that, in the melting step, the rolled polypropylene material be melted at a temperature that is equal to or higher than Tm+15° C. and is equal to or lower than Tm+60° C.

It is preferable that, in the melting step, the rolled polypropylene material be retained for about 5 min at the temperature that is higher than Tm+5° C. and is equal to or lower than Tm+60° C. By retaining the rolled polypropylene material for about 5 min at a temperature that is higher than Tm+5° C. and is equal to or lower than Tm+60° C., the polypropylene material completely melts.

(Heat Treatment Step)

The method for producing a polypropylene material according to the present embodiment includes the heat treatment step of heat-treating the polypropylene material melted in the melting step, at a temperature that is equal to or higher than Tm-20° C. and is lower than Tm-10° C.

Prior to the heat treatment step, the temperature of the polypropylene material after the melting step is lowered to the temperature condition in the heat treatment step.

In the heat treatment step, the polypropylene material melted in the melting step is heat-treated at a temperature that is equal to or higher than Tm-20° C. and is lower than Tm-10° C., where Tm is a melting peak temperature as measured by DSC.

It is preferable that, in the heat treatment step, the polypropylene material be retained at a temperature that is equal to or higher than Tm-20° C. and is lower than Tm-10° C. for more than 5 min and 180 min or less, and more preferably for more than 30 min and 180 min or less. The retaining facilitates the crystallization of the polypropylene material to provide a polypropylene material with a high crystallinity and a high resistance.

A polypropylene material according to the present embodiment can be obtained through the melting step and heat treatment step.

According to the method for producing a polypropylene material according to the present embodiment, the crystallinity A of the polypropylene material and the crystallinity B of the polypropylene material after the heat treatment step (hereinafter, referred to as "heat-treated polypropylene material") can satisfy a relationship of $((B-A)/A) \times 100 = 10\%$ or more. In the present embodiment, the crystallinity A and crystallinity B usually satisfy a relationship of $((B-A)/A) \times 100 = $ less than 60%.

The crystallinity B is preferably 55% or more.

According to the method for producing a polypropylene material according to the present embodiment, the melting peak temperature of the heat-treated polypropylene material as measured by DSC can be equal to or higher than Tm+5° C., where Tm is the melting peak temperature of the polypropylene material not rolled yet. The detailed reason for this, though not exactly clear, may be as follows, for example. In the case where a rolled polypropylene material is heated to the melting peak temperature or higher and cooled as it is, the crystallinity and melting peak temperature of the rolled propylene material are lowered. However, in the case where a rolled polypropylene material is melted at a temperature that is higher than Tm+5° C. and is equal to or lower than Tm+60° C., and further heat-treated at a temperature that is equal to or higher than Tm-20° C. and is lower than Tm-10° C., the recrystallization presumably occurs with the orientation of the molecular chains in the propylene material retained to some extent. Possibly, this can raise the melting peak temperature of a propylene material as well as enhance the crystallinity thereof.

The half-height width from the melting peak temperature of the heat-treated polypropylene material as measured by DSC is preferably 13° C. or more.

As described above, the method for producing a polypropylene material according to the present embodiment can improve the heat resistance of a polypropylene material. In addition, the method for producing a polypropylene material according to the present embodiment can improve the heat resistance of a polypropylene material while maintaining the crystallinity of the polypropylene material at a high level.

Hereinafter, the present invention will be described further in detail based on specific experimental examples. However, the present invention is not limited to the following experimental examples at all, and can be appropriately altered and carried out without altering the spirit of the present invention.

Example 1

Pellets of a polypropylene material (manufactured by Japan Polypropylene Corporation, grade MA3H, melting peak temperature Tm: 166° C. to 169° C.) were pressed at 190° C. at a pressure of 180 kg/cm² to obtain a sheet with a thickness of 1 mm. The obtained sheet was heated at 130° C.

for 10 min with an oven. Subsequently, the sheet was rolled with a pair of 6-inch rolls under conditions that a roll temperature was 110° C., a rolling ratio was four times, and a linear velocity was 4 m/min to obtain a rolled sheet. Subsequently, the temperature of the rolled sheet was raised to 200° C. with a DSC (manufactured by SII Nano Technology Inc., "DSC 6220"), and the sheet was retained for 5 min at 200° C. (melting step). Subsequently, the obtained sheet was cooled to 150° C. under a condition of 50° C./min. Subsequently, the sheet was retained for 3 hours at 150° C. (heat treatment step). Subsequently, the obtained sheet was cooled to 0° C. under a condition of 20° C./min to obtain a polypropylene material sheet. Subsequently, the temperature of the obtained polypropylene material sheet was raised to 200° C. under a condition of 10° C./min and the sheet was retained for 5 min at 200° C. The temperature profile is shown in FIG. 1. By the above-described operations, the melting peak temperature and crystallinity of the polypropylene material sheet before the melting step and the melting peak temperature and crystallinity of the polypropylene material sheet after the heat treatment step were measured. The crystallinity was calculated by dividing the peak area of the DSC curve by 209 mJ/mg and multiplying by 100. The endothermic peak of the DSC curve was defined as the melting peak temperature. The half-height width from the melting peak temperature of the polypropylene material sheet after the heat treatment step was determined from the DSC curve of the polypropylene material sheet after the heat treatment step. The results are shown in Table 1.

Example 2

The temperature of the rolled sheet obtained in Example 1 was raised to 190° C. under a condition of 10° C./min with a DSC (manufactured by SII Nano Technology Inc., "DSC 6220"), and the sheet was retained for 5 min at 190° C. (melting step). Subsequently the obtained sheet was cooled to 150° C. under a condition of 50° C./min. Subsequently, the sheet was retained for 3 hours at 150° C. (heat treatment step). Subsequently, the obtained sheet was cooled to 0° C. under a condition of 20° C./min to obtain a polypropylene material sheet. Subsequently, the temperature of the obtained polypropylene material sheet was raised to 200° C. under a condition of 10° C./min and the sheet was retained for 5 min at 200° C. The melting peak temperature and crystallinity of the polypropylene material sheet before the melting step, the melting peak temperature and crystallinity of the polypropylene material sheet after the heat treatment step, and the half-height width from the melting peak temperature of the polypropylene material sheet after the heat treatment step were determined in the same manner as in Example 1. The results are shown in Table 1.

Example 3

The temperature of the rolled sheet obtained in Example 1 was raised to 220° C. under a condition of 10° C./min with a DSC (manufactured by SII Nano Technology Inc., "DSC 6220"), and the sheet was retained for 5 min at 220° C. (melting step). Subsequently the obtained sheet was cooled to 150° C. under a condition of 50° C./min. Subsequently, the sheet was retained for 3 hours at 150° C. (heat treatment step). Subsequently, the obtained sheet was cooled to 0° C. under a condition of 20° C./min to obtain a polypropylene material sheet. Subsequently, the temperature of the obtained polypropylene material sheet was raised to 200° C. under a condition of 10° C./min and the sheet was retained for 5 min at 200° C. The melting peak temperature and crystallinity of the polypropylene material sheet before the melting step, the melting peak temperature and crystallinity of the polypropylene material sheet after the heat treatment step, and the half-height width from the melting peak temperature of the polypropylene material sheet after the heat treatment step were determined in the same manner as in Example 1. The results are shown in Table 1.

Example 4

The temperature of the rolled sheet obtained in Example 1 was raised to 200° C. under a condition of 10° C./min with a DSC (manufactured by SII Nano Technology Inc., "DSC 6220"), and the sheet was retained for 5 min at 200° C. (melting step). Subsequently, the obtained sheet was cooled to 155° C. under a condition of 50° C./min. Subsequently, the sheet was retained for 3 hours at 155° C. (heat treatment step). Subsequently, the obtained sheet was cooled to 0° C. under a condition of 20° C./min to obtain a polypropylene material sheet. Subsequently, the temperature of the obtained polypropylene material sheet was raised to 200° C. under a condition of 10° C./min and the sheet was retained for 5 min at 200° C. The melting peak temperature and crystallinity of the polypropylene material sheet before the melting step, the melting peak temperature and crystallinity of the polypropylene material sheet after the heat treatment step, and the half-height width from the melting peak temperature of the polypropylene material sheet after the heat treatment step were determined in the same manner as in Example 1. The results are shown in Table 1.

Example 5

The temperature of the rolled sheet obtained in Example 1 was raised to 200° C. under a condition of 10° C./min with a DSC (manufactured by SII Nano Technology Inc., "DSC 6220"), and the sheet was retained for 5 min at 200° C. (melting step). Subsequently, the obtained sheet was cooled to 150° C. under a condition of 50° C./min. Subsequently, the sheet was retained for 1 hour at 150° C. (heat treatment step). Subsequently, the obtained sheet was cooled to 0° C. under a condition of 20° C./min to obtain a polypropylene material sheet. Subsequently, the temperature of the obtained polypropylene material sheet was raised to 200° C. under a condition of 10° C./min and the sheet was retained for 5 min at 200° C. The melting peak temperature and crystallinity of the polypropylene material sheet before the melting step, the melting peak temperature and crystallinity of the polypropylene material sheet after the heat treatment step, and the half-height width from the melting peak temperature of the polypropylene material sheet after the heat treatment step were determined in the same manner as in Example 1. The results are shown in Table 1.

Example 6

The temperature of the rolled sheet obtained in Example 1 was raised to 200° C. under a condition of 10° C./min with a DSC (manufactured by SII Nano Technology Inc., "DSC 6220"), and the sheet was retained for 5 min at 200° C. (melting step). Subsequently, the obtained sheet was cooled to 150° C. under a condition of 10° C./min. Subsequently, the sheet was retained for 3 hours at 150° C. (heat treatment step). Subsequently, the obtained sheet was cooled to 0° C. under a condition of 20° C./min to obtain a polypropylene material sheet. Subsequently, the temperature of the obtained polypropylene material sheet was raised to 200° C. under a condition of 10° C./min and the sheet was retained for 5 min at 200° C. The melting peak temperature and crystallinity of the polypropylene material sheet before the melting step, the melting peak temperature and crystallinity of the polypropylene material sheet after the heat treatment step, and the half-height width from the melting peak temperature of the polypropylene material sheet after the heat treatment step were determined in the same manner as in Example 1. The results are shown in Table 1.

Comparative Example 1

Figure 2:
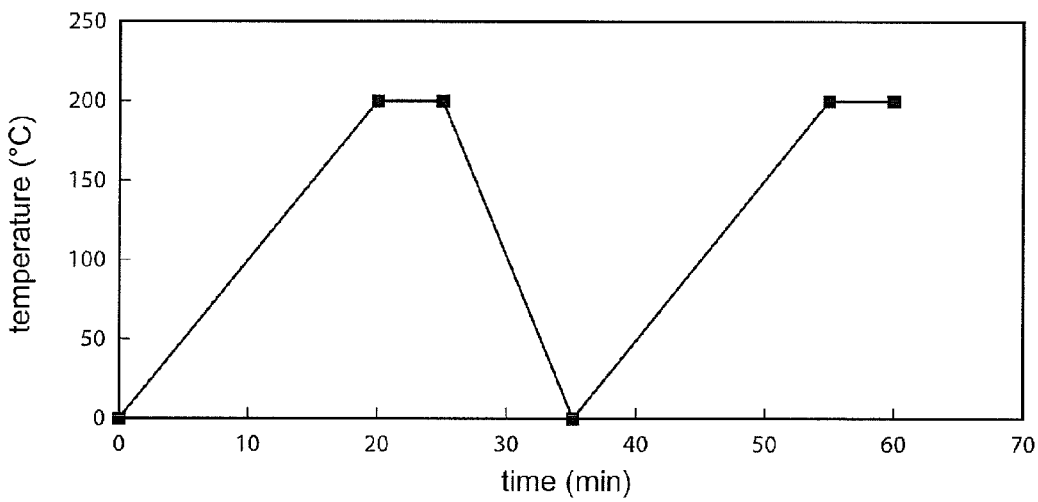
FIG. 2 is a graph showing a temperature profile in Comparative Example 1.

A polypropylene material sheet was obtained in the same manner as in Example 1 except that the cooling rate after the melting step was set to 20° C./min and the heat treatment step was not performed. Subsequently, the temperature of the obtained polypropylene material sheet was raised to 200° C. under a condition of 10° C./min and the sheet was retained for 5 min at 200° C. The temperature profile is shown in FIG. 2. The melting peak temperature and crystallinity of the polypropylene material sheet before the melting step, the melting peak temperature and crystallinity of the polypropylene material sheet after the melting step, and the half-height width from the melting peak temperature of the polypropylene material sheet obtained without performing the heat treatment step were determined in the same manner as in Example 1. The results are shown in Table 1.

Comparative Example 2

The temperature of the rolled sheet obtained in Example 1 was raised to 200° C. under a condition of 10° C./min with a DSC (manufactured by SII Nano Technology Inc., "DSC 6220"), and the sheet was retained for 5 min at 200° C. (melting step). Subsequently, the obtained sheet was cooled to 140° C. under a condition of 50° C./min. Subsequently, the sheet was retained for 180 min at 140° C. (heat treatment step). Subsequently, the obtained sheet was cooled to 0° C. under a condition of 20° C./min to obtain a polypropylene material sheet. Subsequently, the temperature of the obtained polypropylene material sheet was raised to 200° C. under a condition of 10° C./min and the sheet was retained for 5 min at 200° C. The melting peak temperature and crystallinity of the polypropylene material sheet before the melting step, the melting peak temperature and crystallinity of the polypropylene material sheet after the heat treatment step, and the half-height width from the melting peak temperature of the polypropylene material sheet after the heat treatment step were determined in the same manner as in Example 1. The results are shown in Table 1.

Comparative Example 3

The temperature of the rolled sheet obtained in Example 1 was raised to 200° C. under a condition of 10° C./min with a DSC (manufactured by SII Nano Technology Inc., "DSC 6220"), and the sheet was retained for 5 min at 200° C. (melting step). Subsequently, the obtained sheet was cooled to 160° C. under a condition of 50° C./min. Subsequently, the sheet was retained for 3 hours at 160° C. (heat treatment step). Subsequently, the obtained sheet was cooled to 0° C. under a condition of 20° C./min to obtain a polypropylene material sheet. Subsequently, the temperature of the obtained polypropylene material sheet was raised to 200° C. under a condition of 10° C./min and the sheet was retained for 5 min at 200° C. The melting peak temperature and crystallinity of the polypropylene material sheet before the melting step, the melting peak temperature and crystallinity of the polypropylene material sheet after the heat treatment step, and the half-height width from the melting peak temperature of the polypropylene material sheet after the heat treatment step were determined in the same manner as in Example 1. The results are shown in Table 1.

TABLE 1

| | Retention temperature (° C.) in melting step | Cooling rate (° C./min) | Retention temperature (° C.) in heat treatment step | Retention time (min) in heat treatment step | Crystallinity (%) before melting step | Crystallinity (%) after heat treatment step | Melting peak temperature (° C.) before melting step | Melting peak temperature (° C.) after heat treatment step | Rate (%) of change of crystallinity between before melting step and after heat treatment step | Half-height width (° C.) of melting peak temperature |
|---|---|---|---|---|---|---|---|---|---|---|
| Ex. 1 | 200 | 50 | 150 | 180 | 46.7 | 56.9 | 170 | 178.8 | 21.8 | 13.3 |
| Ex. 2 | 190 | 50 | 150 | 180 | 44.2 | 58.4 | 171 | 178.8 | 32.1 | 14.7 |
| Ex. 3 | 220 | 50 | 150 | 180 | 45.7 | 60.8 | 170.3 | 177.7 | 33.0 | 14.7 |
| Ex. 4 | 200 | 50 | 155 | 180 | 49.3 | 56.5 | 170 | 177.5 | 14.6 | 14.7 |
| Ex. 5 | 200 | 50 | 150 | 60 | 45.5 | 58.4 | 171.3 | 178 | 28.4 | 13.8 |
| Ex. 6 | 200 | 10 | 150 | 180 | 50.2 | 60.8 | 169.9 | 178.3 | 21.1 | 13.8 |
| Comp. Ex. 1 | 200 | 20 | no heat treatment step | no heat treatment step | 47.8 | 52.2*[1] | 170.1 | 169.5*[2] | 9.2*[3] | 10 |
| Comp. Ex. 2 | 200 | 50 | 140 | 180 | 45.8 | 58.4 | 170.3 | 171.9 | 27.5 | 13.8 |
| Comp. Ex. 3 | 200 | 50 | 160 | 180 | 47.2 | 46.9 | 170.8 | 169.2 | −0.6 | 12.4 |

*[1] the crystallinity (%) of a polypropylene material sheet obtained without performing the heat treatment step
*[2] the melting peak temperature (° C.) of a polypropylene material sheet obtained without performing the heat treatment step
*[3] the rate (%) of change of crystallinity between before and after the melting step

The invention claimed is:

1. A method for producing a polypropylene material comprising:
   a melting step of melting a polypropylene material rolled in at least one direction, at a temperature that is higher than Tm+5° C. and is equal to or lower than Tm+60° C., where Tm is a melting peak temperature of the polypropylene material not rolled yet as measured by differential scanning calorimetry; and a heat treatment step of heat-treating the polypropylene material melted in the melting step, at a temperature that is equal to or higher than Tm−20° C., and is lower than Tm−10° C.

2. The method for producing a polypropylene material according to claim 1, wherein, in the melting step, the polypropylene material rolled in at least one direction is melted at a temperature that is equal to or higher than Tm+10° C., and is equal to or lower than Tm+60° C.

3. The method for producing a polypropylene material according to claim 1, wherein the polypropylene material before the melting step has a crystallinity A of 40% or more.

4. The method for producing a polypropylene material according to claim 1, wherein the melting peak temperature Tm of the polypropylene material not rolled yet before the melting step is 165° C. or higher.

5. The method for producing a polypropylene material according to claim 1, wherein the heat treatment step is performed for 5 min to 180 min.

6. A polypropylene material obtained by the method for producing a polypropylene material according to claim 1, wherein the crystallinity A of the polypropylene material before the melting step and a crystallinity B of the polypropylene material after the heat treatment step satisfy a relationship of $((B-A)/A) \times 100 = 10\%$ or more;

the crystallinity B is 55% or more; and a melting peak temperature of the polypropylene material after the heat treatment step as measured by differential scanning calorimetry is equal to or higher than Tm+5° C., where Tm is the melting peak temperature of the polypropylene material not rolled yet.

7. The polypropylene material according to claim 6, wherein a half-height width from the melting peak temperature of the polypropylene material after the heat treatment step as measured by differential scanning calorimetry is 13° C. or more.

* * * * *